(12) United States Patent
Ramachandra et al.

(10) Patent No.: US 12,718,405 B2
(45) Date of Patent: Aug. 25, 2026

(54) POSE PARSERS

(71) Applicant: Hinge Health, Inc., San Francisco, CA (US)

(72) Inventors: Bharathkumar Ramachandra, Montreal (CA); Paul Anthony Kruszewski, Westmount (CA)

(73) Assignee: Hinge Health, Inc., San Francisco, CA (US)

( * ) Notice: Subject to any disclaimer, the term of this patent is extended or adjusted under 35 U.S.C. 154(b) by 192 days.

(21) Appl. No.: 18/515,065

(22) Filed: Nov. 20, 2023

(65) Prior Publication Data

US 2024/0095951 A1 Mar. 21, 2024

Related U.S. Application Data

(63) Continuation of application No. PCT/IB2021/056817, filed on Jul. 27, 2021.

(Continued)

(51) Int. Cl.
*G06T 7/73* (2017.01)
*G06V 10/82* (2022.01)

(Continued)

(52) U.S. Cl.
CPC ................ *G06T 7/74* (2017.01); *G06V 10/82* (2022.01); *G06V 20/41* (2022.01); *G06V 40/10* (2022.01);

(Continued)

(58) Field of Classification Search
None
See application file for complete search history.

(56) References Cited

U.S. PATENT DOCUMENTS 11,321,868 B1 * 5/2022 Akbas ........................ G06T 7/73
2019/0188533 A1 * 6/2019 Katabi .................. G06V 10/82

(Continued)

FOREIGN PATENT DOCUMENTS

WO 2020237215 A1 11/2020

OTHER PUBLICATIONS

Cao, Z., Hidalgo, G., Simon, T., Wei, S. E., & Sheikh, Y. (2019). Openpose: Realtime multi-person 2d pose estimation using part affinity fields. IEEE transactions on pattern analysis and machine intelligence, 43(1), 172-186. (Year: 2019).*

(Continued)

*Primary Examiner* — Ian L Lemieux
(74) *Attorney, Agent, or Firm* — Ashurst Perkins Coie US LLP; Andrew T. Pettit

(57) ABSTRACT

An apparatus is provided an apparatus to estimate poses of multiple objects from a two-dimensional image. The apparatus includes a communications interface to receive raw data from an external source. The raw data includes a representation of a first object and a second object. In addition, the apparatus includes a memory storage unit to store the raw data. The apparatus also includes a first neural network engine to detect parts of the first object and the second object and to generate an intermediate representation of the parts. Furthermore, the apparatus includes a second neural network engine to apply a transformer neural network to the intermediate representation to parse the parts into first object parts and second object parts to generate a first pose of the first object from the first object parts and to generate a second pose of the second object from the second object parts.

20 Claims, 6 Drawing Sheets

Related U.S. Application Data

(60) Provisional application No. 63/191,538, filed on May 21, 2021.

(51) Int. Cl.
*G06V 20/40* (2022.01)
*G06V 40/10* (2022.01)

(52) U.S. Cl.
CPC ............... *G06T 2207/10016* (2013.01); *G06T 2207/20084* (2013.01); *G06T 2207/30196* (2013.01)

(56) References Cited

U.S. PATENT DOCUMENTS

2020/0327465 A1* 10/2020 Baek ........................ G06N 3/08
2022/0230425 A1* 7/2022 Kosiorek ............ G06F 18/2415
2022/0254157 A1* 8/2022 Fu ........................ G06N 3/0464
2022/0301304 A1* 9/2022 Hampali ................ G06N 3/045
2024/0221208 A1* 7/2024 Jung ......................... G06T 7/73

OTHER PUBLICATIONS

Li, Y., Zhang, S., Wang, Z., Yang, S., Yang, W., Xia, S. T., & Zhou, E. (2021). TokenPose: Learning Keypoint Tokens for Human Pose Estimation. arXiv preprint arXiv:2104.03516.—see https://arxiv.org/abs/2104.03516v2 Submitted Apr. 9, 2021 (Year: 2021).*

Chu, X., Yang, W., Ouyang, W., Ma, C., Yuille, A. L., & Wang, X. (2017). Multi-context attention for human pose estimation. In Proceedings of the IEEE conference on computer vision and pattern recognition (pp. 1831-1840). (Year: 2017).*

Snower, M., Kadav, A., Lai, F., & Graf, H. P. (2020). 15 keypoints is all you need. In Proceedings of the IEEE/CVF conference on computer vision and pattern recognition (pp. 6738-6748). (Year: 2020).*

Shi, D., Wei, X., Li, L., Ren, Y., & Tan, W. (2022). End-to-end multi-person pose estimation with transformers. In Proceedings of the IEEE/CVF conference on computer vision and pattern recognition (pp. 11069-11078). (Year: 2022).*

Newell, A., Huang, Z., & Deng, J. (2017). Associative embedding: End-to-end learning for joint detection and grouping. Advances in neural information processing systems, 30. (Year: 2017).*

Aidoo, E., Wang, X., Liu, Z., Tenagyei, E. K., Owusu-Agyemang, K., Kodjiku, S. L., . . . & Aggrey, E. S. E. (2022). Cofopose: Conditional 2d pose estimation with transformers. Sensors, 22(18), 6821. (Year: 2022).*

Sun, K., Geng, Z., Meng, D., Xiao, B., Liu, D., Zhang, Z., & Wang, J. (2020). Bottom-up human pose estimation by ranking heatmap-guided adaptive keypoint estimates. arXiv preprint arXiv:2006.15480. (Year: 2020).*

Cao, et al., "Realtime Multi-Person 2D Pose Estimation Using Part Affinity Fields", 2017 IEEE Conference on Computer Vision and Pattern Recognition (CVPR), XP055707263, Jul. 21, 2017, pp. 1302-1310.

Hampali, et al., "HandsFormer: Keypoint Transformer for Monocular 3D Pose Estimation of Hands and Object in Interaction", arxiv.org, XP081946460, Retrieved from the Internet: URL:https://arxiv.org/pdf/2104.14639v1> Apr. 29, 2021.

Stoffl, et al., "End-to-End Trainable Multi-Instance Pose Estimation with Transformers", arxiv.org, XP081914925, Retrieved from the Internet: URL: https://arxiv.org/pdf/2103.12115v1>, Mar. 22, 2021.

Sun, et al., "Rethinking Transformer-based Set Prediction for Object Detection", arxiv.org, XP081820151, Retrieved from the Internet: URL: https://arxiv.org/pdf/2011.10881v1>, Nov. 21, 2020.

Papandreou, et al., "PersonLab: Person Pose Estimation and Instance Segmentation with a Bottom-Up, Part-Based, Geometric Embedding Model", In Proceedings of the European Conference on Computer Vision (ECCV), pp. 269-286, 2018.

Mao, Weian , et al., "TFPose: DIrect Human Pose Estimation with Transformers", [online], arXiv, [retrieved on Aug. 28, 2024], Internet, <URL:https://arxiv.org/pdf/2103.15320>; Mar. 29, 2021, pp. 1-15.

International Search Report and Written Opinion mailed Feb. 21, 2022 for International Patent Application No. PCT/IB2021/056817, 10 pages.

Bulat, A. , et al., "Human Pose Estimation via Convolutional Part Heatmap Regression", arXiv.org, v 1, retrieved from https://arxiv.org/abs/1609.01743 on Feb. 12, 2022 (Feb. 12, 2022), Sep. 6, 2016, pp. 1-16.

Cao, Z. , et al., "Realtime Multi-Person 2D Pose Estimation Using Part Affinity Fields", arXiv.org, v2, retrieved from https: //arxiv .org/abs/1611.08050 on Feb. 12, 2022 (Feb. 12, 2022), Apr. 14, 2017, pp. 1-9.

Insafutdinov, E. , et al., "DcepcrCut: A Deeper, Stronger, and Faster Multi-Person Pose Estimation Model",, arXiv.org, v3, retrieved from https://arxiv.org/abs/1605 .03170 on Feb. 12, 2022 (Feb. 12, 2022), Nov. 30, 2016, pp. 1-22.

Iqbal, U. , et al., "Multi-Person Pose Estimation with Local Joint-to-Person Associations", arXiv.org, v2, pp. 1-15, Aug. 31, 2016 (Aug. 31, 2016), retrieved from https://arxiv.org/abs/1608.08526 on Feb. 12, 2022 (Feb. 12, 2022), Aug. 31, 2016, pp. 1-15.

Lee, Juho , et al., "Set Transformer: A Framework for Attention-based Permutation-Invariant Neural Networks", arXiv.org, v3, ICML 2019, retrieved from https://arxiv.org/abs/18 I0.00825 on Feb. 12, 2022 (Feb. 12, 2022), May 26, 2019, pp. 1-17.

Pishchulin, L. , et al., DeepCut: Joint Subset Partition and Labeling for Multi Person Pose Estimation, Apr. 26, 2016, pp. 1-15.

Toshev, A. , et al., "DeepPose: Human Pose Estimation via Deep Neural Networks", 2014 IEEE Conference on Computer Vision and Pattern Recognition, IEEE, Jun. 23, 2014 (Jun. 23, 2014), XP032649134, Jun. 23, 2014, pp. 1653-1660.

Vaswani, A. , et al., "Attention Is All You Need", arXiv.org, v5, retrieved from https://arxiv.org/abs/1706.03762 on Feb. 12, 2022 (Feb. 12, 2022), Dec. 6, 2017, pp. 1-15.

Wei, S-E , et al., "Convolutional Pose Machines", 2016 IEEE Conference on Computer Vision and Pattern Recognition (CVPR), IEEE, XP033021664, Jan. 27, 2016, pp. 4724-4732.

Xia, F. , et al., "Joint Multi-Person Pose Estimation and Semantic Part Segmentation", arXiv.org, vl, retrieved from https: //arx.iv.org/abs/1708.03383 on Feb. 12, 2022 (Feb. 12, 2022), Aug. 10, 2017, pp. 1-10.

Yu, B. , et al., "Heatmap Regression via Randomized Rounding", arXiv.org, vl retrieved from https://arxiv.org/abs/2009.00225vl on Feb. 12, 2022 (Feb. 12, 2022), Sep. 1, 2020, pp. 1-18.

Carion, et al., "End-to-end object detection with transformers", In European conference on computer vision, pp. 213-229. Cham: Springer International Publishing, 2020.

Fabbri, et al., "Compressed volumetric heatmaps for multi-person 3d pose estimation.", In Proceedings of the IEEE/CVF conference on computer vision and pattern recognition, pp. 7204-7213. 2020.

* cited by examiner

POSE PARSERS

CROSS-REFERENCE TO RELATED APPLICATIONS

This application is a continuation of International Patent Application No. PCT/IB2021/056817, filed on Jul. 27, 2021, which claims the benefit of U.S. Provisional Application No. 63/191,538, filed on May 21, 2021, each of which is incorporated herein by reference in its entirety.

BACKGROUND

Pose parsing to generate a set of poses from a two-dimensional image is known. For example, a hand-designed heuristic algorithm that builds poses from an intermediate representation may be used. In particular, for two-dimensional poses, finding the local peaks in prediction keypoint heatmaps and using the information from predicted bone heatmaps may be used to form connections between keypoints to create poses. In further examples, such as solving the (NP-hard) integer linear programming problem over a fully connected graph or using a recurrent neural network to predict one pose at a time may also be used.

BRIEF DESCRIPTION OF THE DRAWINGS

Reference will now be made, by way of example only, to the accompanying drawings in which.

DETAILED DESCRIPTION

Figure 1:
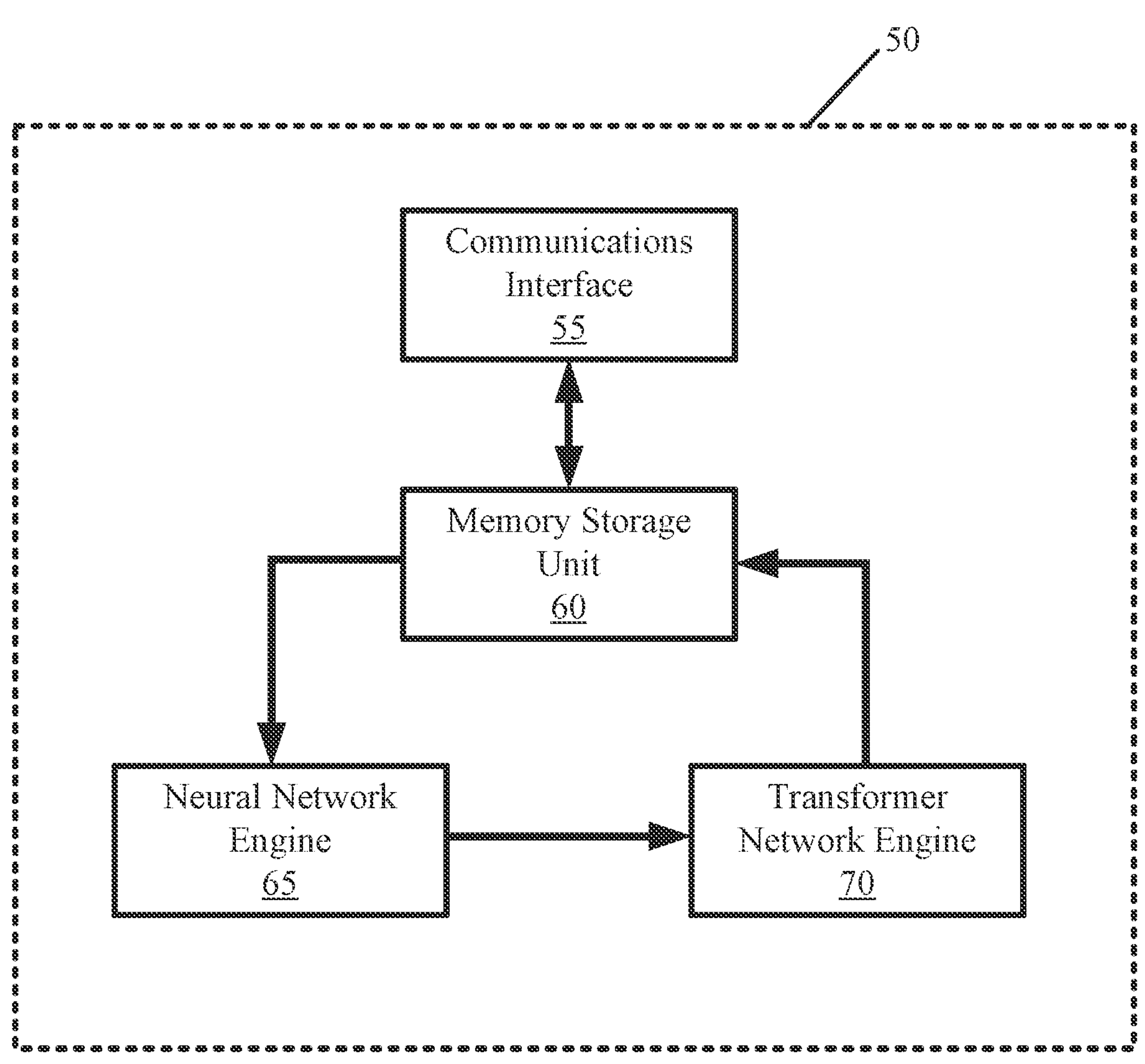
FIG. 1 is a schematic representation of the components of an example apparatus to estimate poses of multiple objects from a two-dimensional image.

As used herein, any usage of terms that suggest an absolute orientation (e.g. "top", "bottom", "up", "down", "left", "right", "low", "high", etc.) may be for illustrative convenience and refer to the orientation shown in a particular Figure. However, such terms are not to be construed in a limiting sense as it is contemplated that various components will, in practice, be utilized in orientations that are the same as, or different than those described or shown.

Pose parsing is a process used to generate poses of multiple objects from a two-dimensional image. The manner by which this is carried out is not particularly limited and various different methods are used. For images with multiple objects, the identification of the objects and each keypoint or part of an object is to be associated with the correct object. Object pose identification may be used for multiple purposes. For example, objects' poses may be identified in an image for use in other downstream application. In particular, the identification of an object pose may be used for tracking the object, such as a player on a sport field, to follow the player's motions and to capture the motions for subsequent playback or analysis.

A computer implemented method is provided to integrate multiple pose estimation tasks and sub-steps into a single unified system, opening the door for end-to-end training, better use of visual context and reduction of error multiplication induced by multiple steps. It uses a fast, fully differentiable approach carried out on a graphics processing unit to go from an intermediate pose representation to a final fixed set of poses. The set of poses may allow for two-dimension pose, three-dimension pose, appearance estimation and instance segmentation and integration of these outputs into a single unified model that benefits from the synergy between tasks.

The method provides an improvement over previous "bottom-up" style pose estimation models. For example, the output of the method can be used to extract single object crops for subsequent tasks on a graphics processing unit without transferring intermediary data, such as heatmaps, to a central processing unit for processing, such as the pose parsing. In addition, the method may be faster at inference time than custom designed pose parsing algorithms in use currently. Furthermore, the method provides supervision of the final coordinates of estimated poses, which may improve accuracy of bottom-up methods. The same method may also provide a bottom-up three-dimension pose estimation model to enable a combined bottom-up two-dimension and three-dimension pose estimation model or an instance segmentation model to enable a combined pose estimation plus instance segmentation model or likewise.

The method may be carried out by an apparatus. The apparatus parses poses in a raw data image without using a separate object detector or (e.g. top-down approaches) or a separate clustering step (e.g. bottom-up approaches). Instead, the apparatus uses a transformer network with positional embeddings and object queries to estimate a variable sized set of output pose coordinates. This is achieved by using an a priori definition of a maximum number of persons (output slots) that can be predicted and having two prediction heads per output slot, one for person/no person binary class prediction and one for pose coordinate prediction. The transformer architecture along with object queries allows parallel decoding of output, as opposed to sequentially predicting one person's pose at a time. Accordingly, this allows the process to be carried out in parallel on a graphics processing unit instead of transferring the portions of the process, such as part detection, from the graphics processing unit to the central processing unit for pose parsing using conventional algorithms, and subsequent back to the graphics processing unit for further processing in downstream tasks.

In the present description, the models and techniques discussed below are generally applied to images of persons. It is to be appreciated by a person of skill with the benefit of this description that the examples described below may be applied to other objects as well such as animals and machines.

Figure 2:
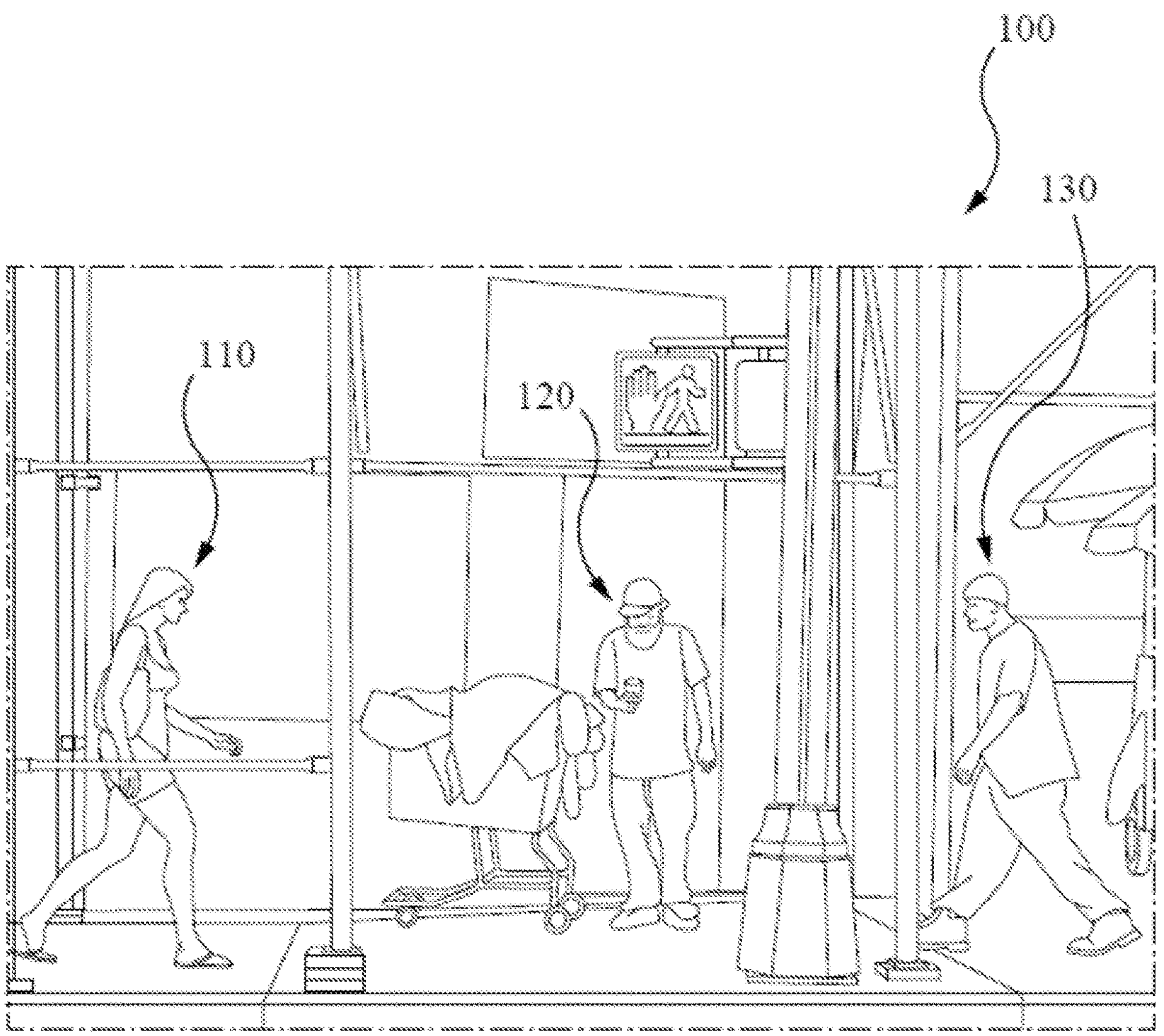
FIG. 2 is an example of raw data representing an image received at the apparatus of FIG. 1.

Referring to FIG. 1, a schematic representation of an apparatus to estimate poses of multiple objects from a two-dimensional image is generally shown at 50. The apparatus 50 may include additional components, such as various additional interfaces and/or input/output devices such as indicators to interact with a user of the apparatus 50. The interactions may include viewing the operational status of the apparatus 50 or the system in which the apparatus 50 operates, updating parameters of the apparatus 50, or resetting the apparatus 50. In the present example, the apparatus 50 is to receive raw data, such as raw data represent an image 100 as shown in FIG. 2, and to process the raw data to estimate the poses of the objects in the image 100. In the present example, the apparatus 50 includes a communications interface 55, a memory storage unit 60, a neural network engine 65, and a transformer network engine 70.

The communications interface 55 is to communicate with an external source to receive raw data representing an image with multiple target objects. In one specific example, the raw data may represent the image 100 with objects 110, 120, 130, which are the people in the image. Although the raw data received by the communications interface 55 may not represent a complex image in some instances, it is to be appreciated that the apparatus 50 is generally configured to handle complex images which are typically a challenge to handle due to occlusions of the objects in the image. The occlusions are not limited and in some cases, the image may include other objects occluding each other. In other examples, the object may involve occlusions caused other features.

The manner by which an object is represented and the exact format of the two-dimensional image is not particularly limited. In the present example, the two-dimensional image may be received in an RGB format. It is to be appreciated by a person of skill in the art with the benefit of this description that the two-dimensional image be in a different format, such as a raster graphic file or a compressed image file captured and processed by a camera. Furthermore, the target objects are not particularly limited. In the present example, the target objects are people. In other examples, the target objects may be a subgroup of people, such as people in the foreground. In further examples, the target objects may non-human, such as animals and machines.

Furthermore, the manner by which the communications interface 55 receives the raw data is not limited. In the present example, the communications interface 55 communicates with external source over a network, which may be a public network shared with a large number of connected devices, such as a WiFi network or cellular network. In other examples, the communications interface 55 may receive data from an external source via a private network, such as an intranet or a wired connection with other devices. In addition, the external source from which the communications interface 55 receives the raw data is not limited to any type of source. For example, the communications interface 55 may connect to another proximate portable electronic device capturing the raw data via a Bluetooth connection, radio signals, or infrared signals. As another example, the communications interface 55 is to receive raw data from a camera system or an external data source, such as the cloud. The raw data received via the communications interface 55 is generally to be stored on the memory storage unit 60.

In another example, the apparatus 50 may be part of a portable electronic device, such as a smartphone, that includes a camera system (not shown) to capture the raw data. Accordingly, in this example, the external source may be part of the apparatus 50 and the communications interface 55 may include the electrical connections within the portable electronic device to connect the apparatus 50 portion of the portable electronic device with the camera system. The electrical connections may include various internal buses within the portable electronic device.

Furthermore, the communications interface 55 may be used to transmit results, such as a pose estimation based on the raw data. For example, the communications interface 55 may be in communication with a downstream service, such as an animation engine (not shown) or pose analyzer. Accordingly, the apparatus 50 may operate to receive raw data from an external source representing multiple objects with complex occlusions to be segmented. In particular, the apparatus 50 may be a portable electronic device, such as a smartphone with a camera, that is capable of capturing an image with the camera and generating a pose of each object in the image.

The memory storage unit 60 is to store the raw data received via the communications interface 55. In particular, the memory storage unit 60 may store raw data including two-dimensional images representing objects for which pose estimations are to be generated. In the present example, the memory storage unit 60 may be store multiple two-dimensional images representing different objects in as frame of a video. Accordingly, the raw data may be video data representing the movement of various objects in the image. As a specific example, the objects may be images of people of different sizes and may include the people in different poses showing different keypoints, referred to as joints for people, and having some portions of the body of the person occlude other keypoints and portions of the same body or portions of another body. For example, the image may be of sport scene as shown in the image 100 where multiple players are captured moving about in normal game play. It is to be appreciated by a person of skill that in such a scene, each player may occlude another player.

Furthermore, the memory storage unit 60 may be used to store addition data. For example, the memory storage unit 60 may store various reference data sources, such as templates and model data, to be used by the neural network engine 65 or the transformer network engine 70. It is to be appreciated that the memory storage unit 60 may be a physical computer readable medium used to maintain multiple databases, or may include multiple mediums that may be distributed across one or more external servers, such as in a central server or a cloud server.

In the present example, the memory storage unit 60 is not particularly limited includes a non-transitory machine-readable storage medium that may be any electronic, magnetic, optical, or other physical storage device. As mentioned above, the memory storage unit 60 may be used to store information such as raw data received from external sources via the communications interface 55, template data, training data, results from the neural network engine 65, and/or results from the post-processing engine 70. In addition, the memory storage unit 60 may be used to store instructions for general operation of the apparatus 50. The memory storage unit 60 may also store an operating system that is executable by a processor to provide general functionality to the apparatus 50 such as functionality to support various applications. The memory storage unit 60 may additionally store instructions to operate the neural network engine 65 and the post-processing engine 70. Furthermore, the memory storage unit 60 may also store control instructions to operate other components and any peripheral devices that may be installed with the apparatus 50, such cameras and user interfaces.

The memory storage unit 60 may be preloaded with data or instructions to operate components of the apparatus 50. In other examples, the instructions may be loaded via the communications interface 55 or by directly transferring the instructions from a portable memory storage device connected to the apparatus 50, such as a memory flash drive. In other examples, the memory storage unit 60 may be an external unit such as an external hard drive, or a cloud service providing content.

The neural network engine 65 is to receive or retrieve the raw data stored in the memory storage unit 60. The neural network engine 65 subsequently detects parts of the objects in the image represented by the raw data and generates an intermediate representation of the parts that are detected. The manner by which the neural network engine 65 generates the intermediate representation is not particularly limited. In the present example, the neural network engine 65 may apply a convolution neural network to the raw data to generate the intermediate representation. Continuing with the example, the convolution neural network applied by the neural network engine to implement a body part detection model is not limited and may involve any model that may receive an image as input and produce an intermediate representation of body part detections represented as spatial two-dimensional feature maps.

Figure 3A:
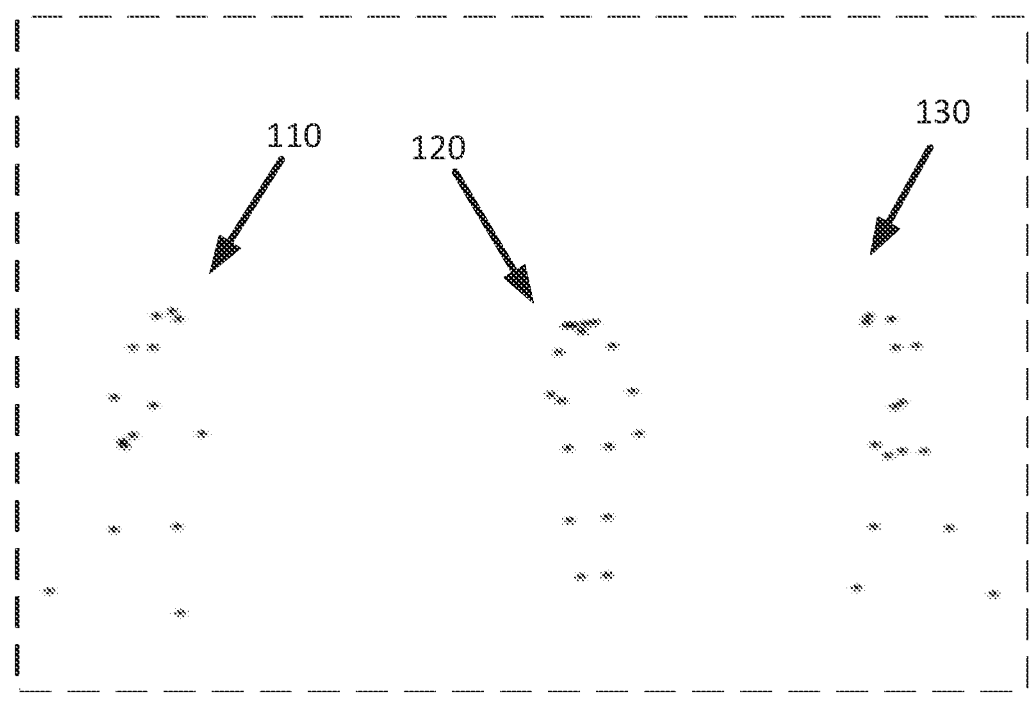
FIG. 3A is a joint heatmap of a combination of a plurality of predefined joints estimated from the image of FIG. 2.

The intermediate representation is not particularly limited. For example, the neural network engine 65 may generate multiple keypoint heatmaps as the intermediate representation, where each keypoint heatmap represents a keypoint of one of the objects in the image 100. Referring to FIG. 3A, the keypoint heatmaps are combined to show the visible keypoints in the image 100. In particular, it is to be appreciated by a person of skill with the benefit of this description that the combined heatmap shown in FIG. 3A may be a sum of the keypoint heatmaps values for each keypoint as determined by the neural network engine 65 when overlaid on top of each other.

Figure 3B:
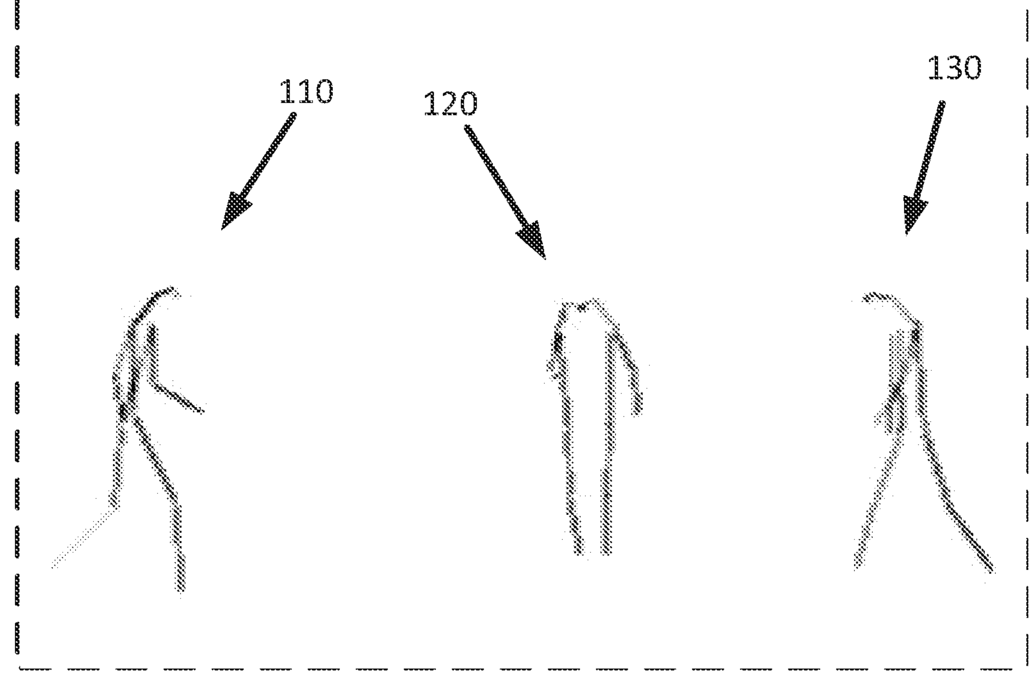
FIG. 3B is a bone heatmap of a combination of a plurality of predefined joints estimated from the image of FIG. 2.

The intermediate representation generated by the neural network engine 65 may be a plurality of connector heatmaps represented by part affinity fields, which are vector fields that describe association between parts, the parts being keypoints here. Combining the connector heatmaps may generate an intermediate representation as shown in FIG. 3B. Referring to FIG. 3B, the connector heatmaps are combined to show the visible connectors in the image 100. In particular, it is to be appreciated by a person of skill with the benefit of this description that the combined heatmap shown in FIG. 3B may be a sum of the connector heatmaps values for each connector as determined by the neural network engine 65 when overlaid on top of each other. In the present example, each connector may represent a "bone" between two keypoints or "joints". It is to be appreciated by a person of skill in the art with the benefit of this description that the terms "joint" and "bone" refer to various reference points in a person that may be modeled with a range of motion to represent an approximation of the reference points on a person. For example, a joint may refer to a reference point on a person that is not a physiological joint, such as an eye. In other examples, a joint may refer to a reference point with multiple physiological bone joints, such as a wrist or ankle. Similarly, a connector or bone may refer to a connection between joints as described herein.

In other examples, the neural network engine 65 may also generate other intermediate representations. For example, the neural network engine 65 may generate Gaussian bone heatmaps, which is a type of connector heatmap. In this example, the Gaussian bone heatmaps may be represented by additional maps with elliptical Gaussians whose major axes are aligned with the line joining pairs of keypoints.

As another example, the neural network engine 65 may also generate associative embeddings. In this example, the associative embedding tag map contains a unique ID tag that serves to identify each pixel with the identity of a person in the image. Thus, a pose read-out can be achieved by simply connecting the keypoints that share the same ID tag in the tag map.

The transformer network engine 70 is to apply a transformer neural network model to the intermediate representation generated by the neural network engine 65. The transformer neural network architecture is a type of network that may be used to take the intermediate representation of part detections along with a type of connector heatmap or associative embedding map or likewise from the neural network engine and solve a part-to-object association problem to output a fixed set of poses comprised of the parts. In the present example, the transformer network engine 70 uses less computational resources than carrying out complicated calculations to parse the intermediate representations into separate poses of each object in the image using a differentiable and end-to-end trainable manner. Upon parsing the intermediate representations, the transformer network engine 70 generates a plurality of poses, such as a set of ground truth poses corresponding to the objects in the image. Accordingly, the transformer network engine 70 may be executed on a graphics processor unit, such as the same graphics processing unit that carries out the functions of the neural network 65 the instead of transferring the intermediate representations to another processor to carry out more computationally intensive calculations to parse the poses, such as solving an integer linear programming problem over a fully connected graph or executing a recurrent neural network, both of which use more computational resources than the transformer neural network carried out by the transformer network engine 70.

Figure 4:
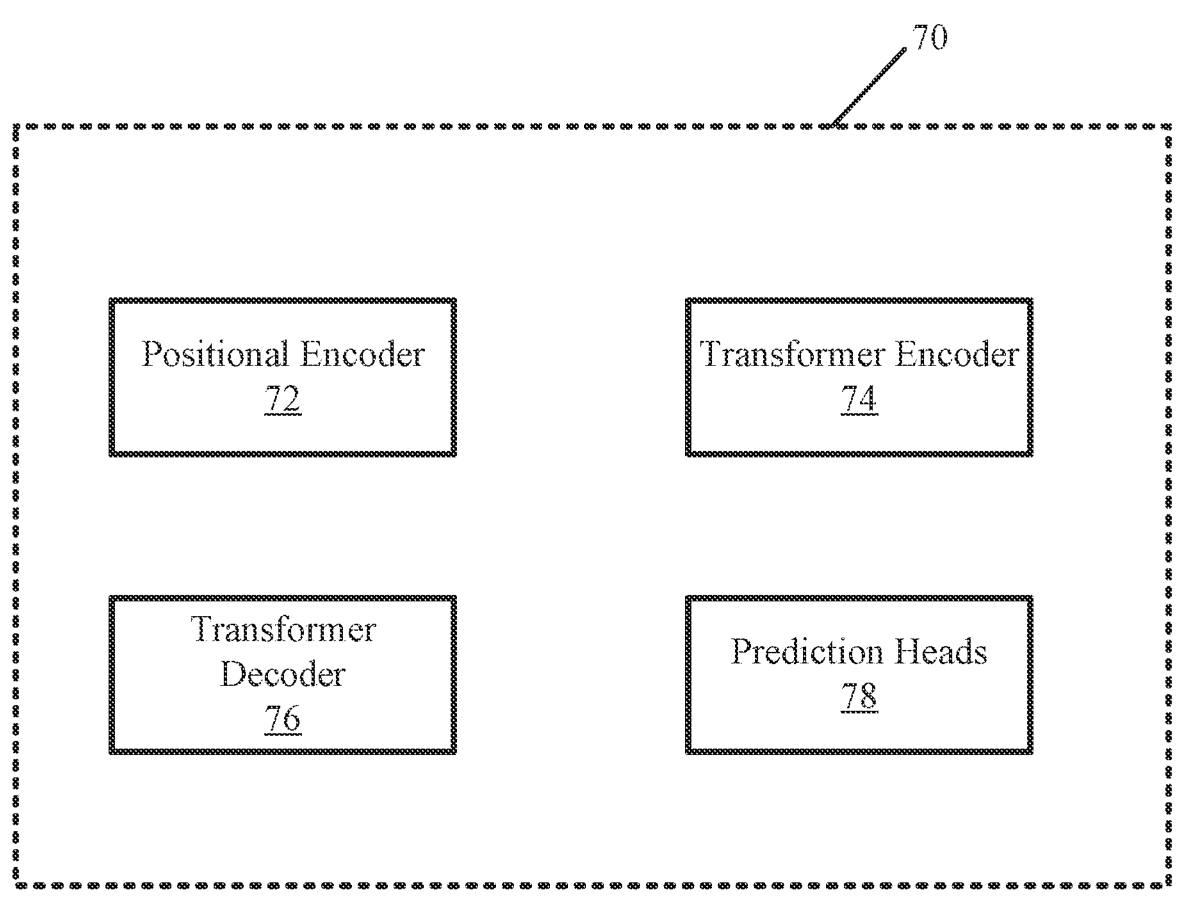
FIG. 4 is a schematic representation of an architecture for two-dimensional pose estimation carried out by the transformer network engine.

Referring to FIG. 4, the transformer neural network architecture carried out by the transformer network engine 70 is shown in greater detail. In the present example, the transformer network engine 70 may to include a positional encoder 72, a transformer encoder 74, a transformer decoder 76, and prediction heads.

In the present example, it is to be appreciated by a person of skill with the benefit of this description that the output poses are permutation invariant. The positional encoder 72 injects positional information about the input spatial feature maps in the intermediate representation. The input positional encodings are generated by applying a sum of sine and cosine functions to each of the pixel coordinate maps (x and y) and embedded into the keypoint heatmap by element-wise addition. The output positional encodings are vectors learnt during the learning process and used by the transformer decoder in generating the output.

The transformer encoder 74 and the transformer decoder 76 process the intermediate representation with the injected positions. In the present example, the transformer encoder 74 is composed of a stack of identical data layers where each layer has two sub-layers. The transformer encoder 74 then applies out a multi-head self-attention mechanism, and a simple, position-wise fully connected feed-forward network. The transformer decoder 76 is also composed of a stack of identical data layers. In addition, the transformer decoder 76 uses output positional encodings/object queries which are leamt from data, to prevent the output heads from competing against each other to process the pose information of a same person in the image. In addition to the two sub-layers in each layer of the transformer encoder 74, the transformer decoder 76 inserts a third sub-layer, which performs multi-head attention over the output of the stack from the transformer encoder 74. Similar to the transformer encoder, residual connections around each of the sub-layers, followed by layer normalization is carried out. It is to be appreciated by a person of skill with the benefit of this description that the transformer encoder 74 and the transformer decoder 76 provide the ability to perform global reasoning on the intermediate representation received from the neural network engine 65. Multi-head self-attention is a module that runs several self-attention mechanisms in parallel. An attention mechanism takes 3 inputs, a query (Q), key (K) and value (V) and performs the operation g(f(Q, K), V). When Q=K=V, the attention mechanism is referred to as self-attention. The particular form of self-attention used here is the scaled dot-product attention function which determines the functions f( ) and g( ).

In the present example, the number of outputs from the transformer decoder 76 to the prediction heads 78 is to be fixed to a number larger than the maximum expected number of outputs. In examples where the number of objects is greater than number of outputs, a null output token may be added on the excess outputs. Accordingly, this provides the ability to predict poses in an image with an unknown number of objects up to the number of outputs. In the present example, the transformer decoder 76 generates four outputs. However, it is to be appreciated by a person of skill with the benefit of this description that in other examples, the transformer decoder 76 may generate more or less than four outputs.

In the present example, the transformer decoder 76 generates outputs in parallel rather than sequentially to provide an efficient manner to train and infer from the model in particular, the object queries and/or output positional embeddings act as anchors for the prediction heads 78. This allows the prediction heads 78 to avoid competing for output predictions from the transformer decoder 76. Instead, the prediction heads 78 may then specialize in the types of predictions for which they are responsible.

The transformer network 70 may execute a biparte matching loss operation to be applied to the results from the prediction heads 78 to training this system using labeled pose data. In the present example, the biparte matching loss operation is to solve the stable marriage problem inside the loss function. This results in the correct number of outputs to be emitted as well as provides permutation-invariant penalization of a variable number of outputs per image.

In the present example, the bipartite matching loss for the pose parsing process may be carried out with the following calculation. The number of predictions from the transformer network may be assumed to be N, where N is preset to a number typically much larger than the maximum number of persons expected in an image. Continuing with this example, y may be the set of ground truth persons and $$\hat{y} = \{\hat{y}_i\}_{i=1}^{N}$$

may be the set of N predictions. Without loss of generality, y may be considered to also be a set of size N, padded with Ø (no person). To find a bipartite matching between these two sets, a permutation of N elements $\sigma \in S_N$ with the lowest cost may be searched:

$$\hat{\sigma} = \underset{\sigma \in S_N}{\operatorname{argmin}} \sum L_{match}(y_i, \hat{y}_{\sigma(i)})$$

where L is a pairwise matching cost between ground truth $y_i$, and a prediction with an index σ(i). The optimal assignment may be computed with the Hungarian algorithm.

The matching cost takes into account both a binary class prediction (person/no person) and the similarity of predicted and ground truth poses. Each element i of the ground truth can be seen as $y_i=(c_i, r_i)$ where c, is the target class label and $r_i \in R^{2J}$ is a vector that defines on-image coordinates for the ground truth keypoints comprising a person's pose.

For the prediction with index σ(i), the probability of class $c_i$, can be defined as $p\hat{}_{\sigma(i)}(c_i)$ and the predicted pose as $r\hat{}_i$. With these notations, the following may be defined:

$$L_{match}(y_i, \hat{y}_{\sigma(i)}) as - 1_{\{c_i \neq \varnothing\}} \hat{p}_{\sigma(i)}(c_i) + 1_{\{c_i \neq \varnothing\}} L_{pose}(r_i, \hat{r}_{\sigma(i)}).$$

The second step is to compute the loss function, the Hungarian loss for all pairs matched in the previous step. The loss is defined by a linear combination of a negative log-likelihood for class prediction and a pose regression loss.

$$L_{Hungarian}(y, \hat{y}) = \sum_{i=1}^{N} \left[ -\log \hat{p}_{\hat{\sigma}(i)}(c_i) + 1_{c_1 = \varnothing} L_{pose}(r_i, \hat{r}_{\hat{\sigma}(i)}) \right].$$

where σ^ is the optimal assignment computed in the first step.

Finally, the pose regression loss is defined as:

$$L_{pose}(r_i, \hat{r}_{\sigma(i)}) = \|r_i - \hat{r}_{\sigma(i)}\| 2.$$

The particular form of the pose regression loss may take on other forms, as long as it represents a differentiable function that provides a measure of how different a given pair of poses are.

Figure 5:
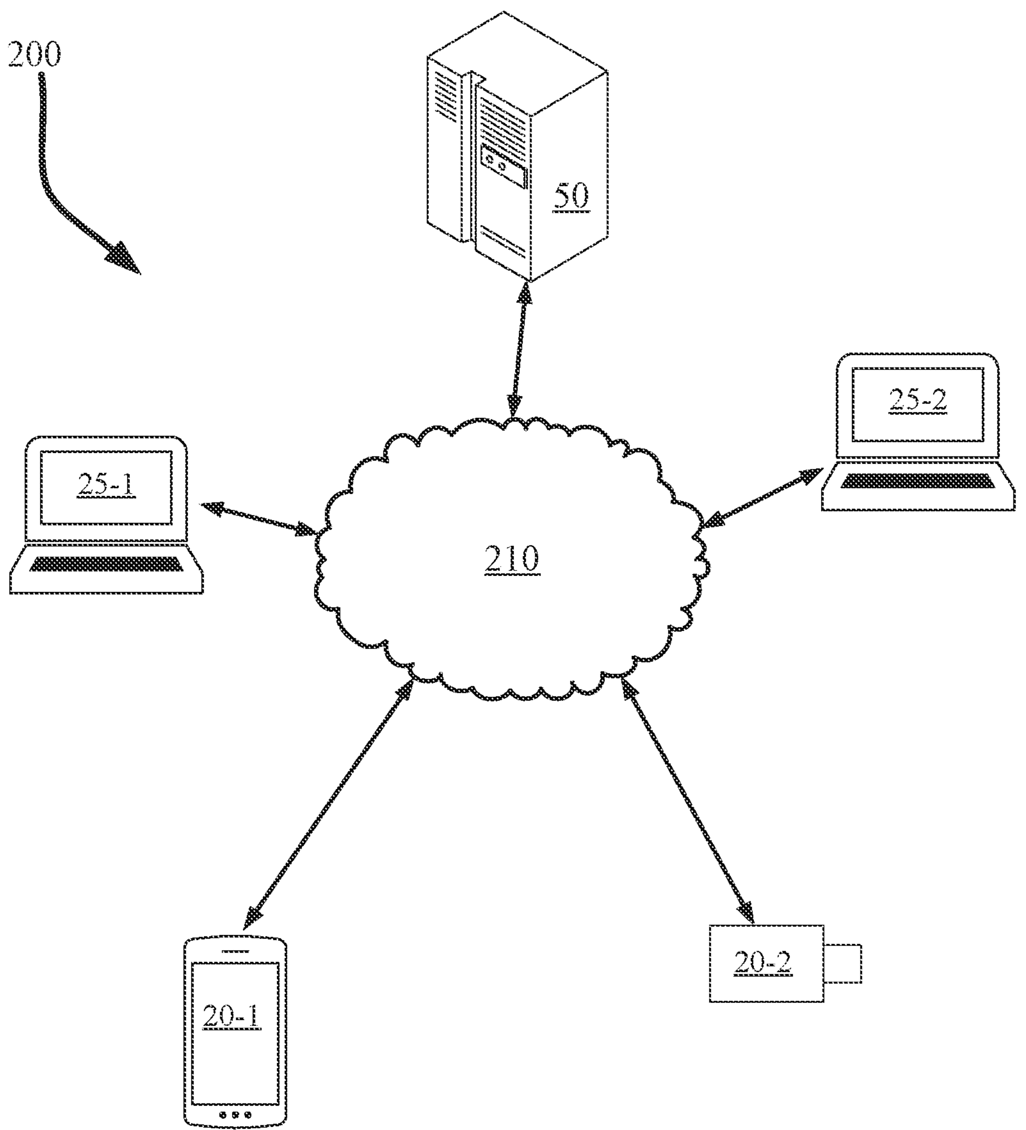
FIG. 5 is a schematic representation of a system to provide access to an apparatus to estimate poses of multiple objects from a two-dimensional image.

Referring to FIG. 5, a schematic representation of a computer network system is shown generally at 200. It is to be understood that the system 200 is purely exemplary and it will be apparent to those skilled in the art that a variety of computer network systems are contemplated. The system 200 includes the apparatus 50 to estimate poses of multiple objects from a two-dimensional image, a plurality of external sources 20-1 and 20-2 (generically, these external sources are referred to herein as "external source 20" and collectively they are referred to as "external sources 20"), and a plurality of content requesters 25-1 and 25-2 (generically, these content requesters are referred to herein as "content requesters 25" and collectively they are referred to as "content requesters 25") connected by a network 210. The network 210 is not particularly limited and may include any type of network such as the Internet, an intranet or a local area network, a mobile network, or a combination of any of these types of networks. In some examples, the network 210 may also include a peer to peer network.

In the present example, the external sources 20 may be any type of computing device used to communicate with the apparatus 50 over the network 210 for providing raw data such as an image 100 of an object. For example, the external source 20-1 may be a smartphone. It is to be appreciated by a person of skill with the benefit of this description that the external source 20-1 may be substituted with a laptop computer, a portable electronic device, a gaming device, a mobile computing device, a portable computing device, a tablet computing device or the like. In some examples, the external source 20-2 may be a camera to capture an image. The raw data may be generated from an image or video received or captured at the external source 20. The content requesters 25 may also be any type of computing device used to communicate with the apparatus 50 over the network 210 to receive the parsed pose estimates of the image 100. For example, content requesters 25 may be a downstream service provider, such as an animation engine or pose analyzer.

Figure 6:
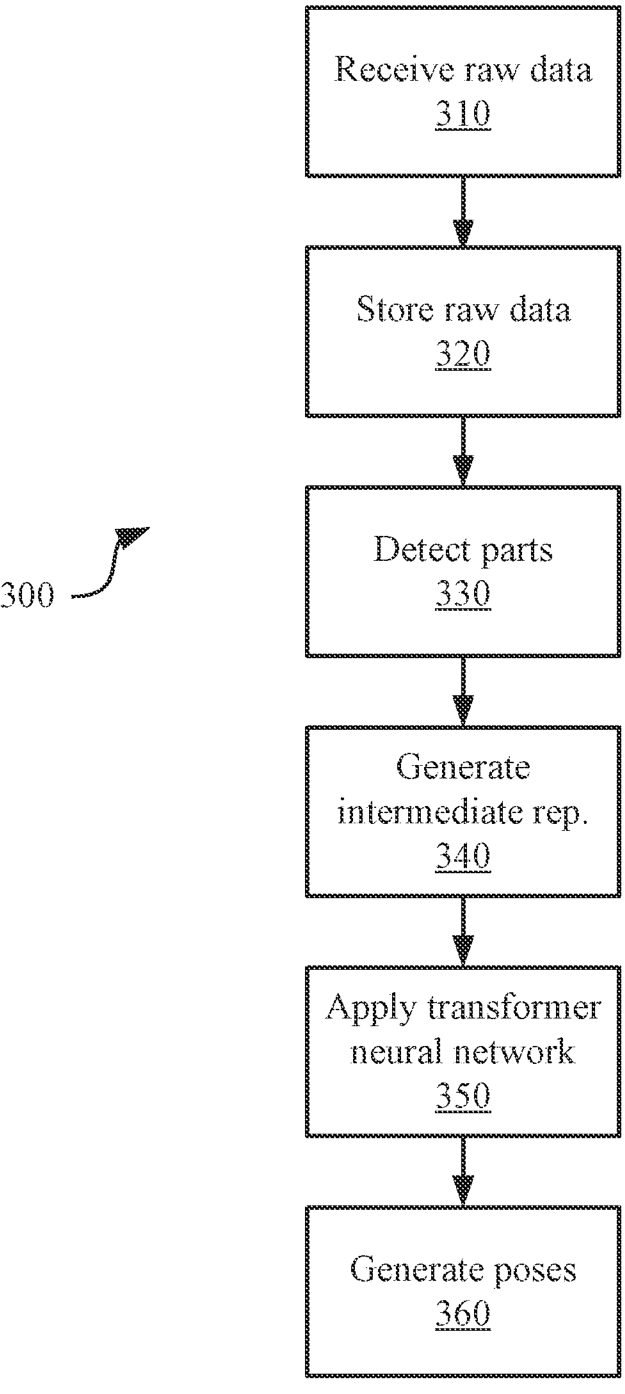
FIG. 6 is a flowchart of an example of a method of estimate poses of multiple objects from a two-dimensional image.

Referring to FIG. 6, a flowchart of an example method of to estimate poses of multiple objects from a two-dimensional image is generally shown at 300. In order to assist in the explanation of method 300, it will be assumed that method 300 may be performed by the apparatus 50. Indeed, the method 300 may be one way in which the apparatus 50 may be configured. Furthermore, the following discussion of method 300 may lead to a further understanding of the apparatus 50 and it components. In addition, it is to be emphasized, that method 300 may not be performed in the exact sequence as shown, and various blocks may be performed in parallel rather than in sequence, or in a different sequence altogether.

Beginning at block 310, the apparatus 50 receives raw data from an external source via the communications interface 55. In the present example, the raw data includes a representation of an image with multiple objects, such as people. The manner by which the person is represented and the exact format of the two-dimensional image is not particularly limited. For example, the two-dimensional image may be an RGB format. In other examples, the two-dimensional image be in a different format, such as a raster graphic file or a compressed image file captured and processed by a camera. Once received at the apparatus 50, the raw data is to be stored in the memory storage unit 60 at block 320.

Block 330 involves detects parts of the objects in the image represented by the raw data using the neural network engine 65, which may apply a convolutional neural network to the raw data. The types of parts of the image detected is not particularly limited. For example, the neural network engine 65 may detect keypoints, such as joints. In other examples, the neural network engine 65 may detect connectors between keypoints, such as bones.

Next, block 340 comprises generating intermediate representations of the parts that are detected with the neural network engine 65. The intermediate representation is not particularly limited. For example, the intermediate representation may be a plurality of keypoint heatmaps, where each keypoint heatmap represents a keypoint of one of the objects in the image 100. In other examples, the intermediate representation may be a plurality of connector heatmaps or associative embeddings.

A transformer neural network model is applied to the intermediate representation at block 350 to parse the intermediate representations into separate poses of the objects in the image 100 in a differentiable and end-to-end trainable manner. Block 360 uses the parsed intermediate representations to generate a plurality of estimated poses corresponding to the objects in the image.

Various advantages will now become apparent to a person of skill in the art. In particular, the apparatus 50 may be used to parse poses in a two-dimensional image with an efficient transformer neural network. In particular, this avoids the use of a slow non-differentiable clustering approach and/or other computationally heavy, sequential operations to provide faster processing times. Due to the faster processing times, the process may be carried out on a single graphics processing unit or on a portable electronic device, such as a smartphone. Since many portable electronic devices include a camera, it is to be appreciated by a person of skill in the art with the benefit of this description that the entire process from the capture of an image with multiple objects, such as a sport scene with people, can be processed to generate a plurality of poses for the objects in the image. This may be used by downstream services, such as a pose analyzer, to extract further data or to analyze movements of players in a game or to review errors for improvement by coaching staff.

It should be recognized that features and aspects of the various examples provided above may be combined into further examples that also fall within the scope of the present disclosure.

We claim:

1. An apparatus comprising:

a communications interface that is configured to receive, from an external source, video data that represents movement of a first person and a second person;

a first neural network engine that is configured to:

apply a convolutional neural network to a frame of the video data to detect parts of the first person and the second person, and generate heatmaps as an intermediate representation of the parts, wherein each of the heatmaps corresponds to a different one of the parts; and a second neural network engine that is configured to:

apply a transformer neural network to the intermediate representation to parse the heatmaps into first person heatmaps and second person heatmaps to (i) generate a first pose of the first person from the first person heatmaps and (ii) generate a second pose of the second person from the second person heatmaps, wherein the transformer neural network includes:

a positional encoder that, in operation, injects positional information about the heatmaps in the intermediate representation, a transformer encoder that, in operation, applies a multi-head, self-attention mechanism to the intermediate representation with the positional information to produce an output, and a transformer decoder that, in operation, performs multi-head attention over the output produced by the transformer encoder to produce outputs, and prediction heads that, in operation, produce predictions based on the outputs produced by the transformer decoder.

2. The apparatus of claim 1, wherein an architecture of the transformer neural network allows the transformer neural network to generate the first pose of the first person and the second pose of the second person in parallel.

3. The apparatus of claim 2, wherein the heatmaps are keypoint heatmaps, each of which represents a keypoint of the first person or the second person, and wherein the plurality of keypoint heatmaps collectively show all keypoints of the first person and the second person that are visible in the frame.

4. The apparatus of claim 2, wherein the intermediate representation further includes a plurality of affinity fields, each of which is representative of a vector that describes association between the parts represented by the heatmaps.

5. The apparatus of claim 2, wherein the intermediate representation further includes a plurality of associative embeddings, each of which includes a unique identifier that serves to identify each pixel with the first person or the second person.

6. The apparatus of claim 1, wherein the first neural network engine and the second neural network engine are executed by a graphics processing unit.

7. The apparatus of claim 1, wherein the second neural network engine is configured to execute a bipartite matching loss operation to parse the first object heatmaps of the first object and the second object heatmaps of the second object.

8. A method comprising:

receiving, via a communications interface, raw data that includes an image of a first object and a second object;

applying, to the image, a convolutional neural network that identifies parts of the first object and the second object;

generating multiple heatmaps as an intermediate representation of the parts;

applying, to the intermediate representation, a transformer neural network that parses the multiple heatmaps into first object heatmaps and second object heatmaps, thereby parsing the parts into first object parts and second object parts;

generating a first pose of the first object from the first object heatmaps; and generating a second pose of the second object from the second object heatmaps.

9. The method of claim 8, wherein the heatmaps are keypoint heatmaps.

10. The method of claim 8, further comprising generating a plurality of affinity fields to be included in the intermediate representation of the parts.

11. The method of claim 8, wherein further comprising generating a plurality of associative embeddings to be included in the intermediate representation of the parts.

12. The method of claim 8, further comprising:

executing a neural network engine that applies the transformer neural network on a graphics processing unit.

13. The method of claim 8, further comprising:

executing a bipartite matching loss operation to parse the multiple heatmaps into the first object heatmaps and the second object heatmaps.

14. A non-transitory computer readable medium encoded with codes, wherein the codes are to direct a processor to:

apply, to an image that includes a first object and a second object, a convolutional neural network that detects parts of the first object and the second object;

generate heatmaps as an intermediate representation of the parts, wherein each of the heatmaps is associated with a different one of the parts;

apply, to the heatmaps, a transformer neural network that parses the heatmaps into first object heatmaps and second object heatmaps, thereby parsing the parts into first object parts and second object parts;

generate a first pose of the first object from the first object heatmaps corresponding to the first object parts; and generate a second pose of the second object from the second object heatmaps corresponding to the second object parts.

15. The non-transitory computer readable medium of claim 14, wherein the transformer neural network is designed to:

generate positional encodings for the heatmaps by applying a sum of sine and cosine functions to pixel coordinate maps associated with the heatmaps, embed the positional encodings into the heatmaps by element-wise addition, and predict which of the heatmaps are the first object heatmaps and which of the heatmaps are the second object heatmaps in parallel based on an analysis of the heatmaps with the positional encodings embedded therein.

16. The non-transitory computer readable medium of claim 14, wherein the codes are to direct the processor to generate a plurality of affinity fields as a portion of the intermediate representation.

17. The non-transitory computer readable medium of claim 14, wherein the codes are to direct the processor to generate a plurality of associative embeddings as a portion of the intermediate representation.

18. The non-transitory computer readable medium of claim 14, wherein the codes are to direct the processor to apply the transformer neural network on a graphics processing unit.

19. The non-transitory computer readable medium of claim 14, wherein the codes are to direct the processor to execute a bipartite matching loss operation to parse the heatmaps into the first object heatmaps and the second object heatmaps.

20. A method for establishing poses of multiple persons included in an image, the method comprising:

applying, to the image, a first neural network that identifies parts of the multiple persons;

generating heatmaps as an intermediate representation of the parts, wherein each of the heatmaps indicates location, within the image, of either one of the parts or a connector between a pair of the parts;

applying, to the intermediate representation, a second neural network that has a transformer architecture and that parses the parts into multiple sets, each of which is associated with a corresponding one of the multiple persons, wherein the second neural network is designed to:

generate positional encodings for the heatmaps by applying a sum of sine and cosine functions to pixel coordinate maps associated with the heatmaps, embed the positional encodings into the heatmaps by element-wise addition, and predict which of the heatmaps are the first object heatmaps and which of the heatmaps are the second object heatmaps in parallel based on an analysis of the heatmaps with the positional encodings embedded therein; and for each of the multiple persons, generating a pose based on an analysis of heatmaps in the corresponding set of the multiple sets.

* * * * *